(12) United States Patent
Umezu (10) Patent No.: US 8,437,094 B2
(45) Date of Patent: May 7, 2013

(54) LENS BARREL WITH OPTICAL FILTER AND OPTICAL APPARATUS HAVING THE SAME

(75) Inventor: Takuji Umezu, Utsunomiya (JP)

(73) Assignee: Canon Kabushiki Kaisha (JP)

(*) Notice: Subject to any disclaimer, the term of this patent is extended or adjusted under 35 U.S.C. 154(b) by 39 days.

(21) Appl. No.: 13/268,207

(22) Filed: Oct. 7, 2011

(65) Prior Publication Data
US 2012/0105984 A1    May 3, 2012

(30) Foreign Application Priority Data

Oct. 27, 2010 (JP) ................................ 2010-240900

(51) Int. Cl.
*G02B 7/02* (2006.01)

(52) U.S. Cl.
USPC ............................ 359/819; 359/822; 359/823

(58) Field of Classification Search .......... 359/694–704, 359/811–830
See application file for complete search history.

(56) References Cited

U.S. PATENT DOCUMENTS

| 7,283,315 | B2 * | 10/2007 | Noguchi ........................ 359/819 |
| 8,218,250 | B2 * | 7/2012 | Nakamura ..................... 359/700 |
| 8,325,431 | B2 * | 12/2012 | Fukino ........................... 359/824 |

FOREIGN PATENT DOCUMENTS

JP        2010-008801 A    1/2010

* cited by examiner

*Primary Examiner* — Mohammed Hasan
(74) *Attorney, Agent, or Firm* — Rossi, Kimms & McDowell LLP (57) ABSTRACT

A lens barrel includes a lens holding member that holds a lens, a positioning guide bar, a rotation blocking guide bar, an optical filter holding member that holds an optical filter, an optical filter supporting member that is disposed at a side of the lens holding member with reference to the optical filter holding member and that supports the optical filter holding member, and an image pickup element holding member that is disposed at a side of an image pickup element with reference to the optical filter holding member and that has a positioning guide bar holding portion that holds the positioning guide bar. The optical filter supporting member includes a rotation blocking guide bar holding portion that holds the rotation blocking guide bar, and the rotation blocking guide bar holding portion is positioned in an insertion and removal range of the optical filter holding member.

3 Claims, 7 Drawing Sheets

LENS BARREL WITH OPTICAL FILTER AND OPTICAL APPARATUS HAVING THE SAME

BACKGROUND OF THE INVENTION

1. Field of the Invention

The present invention relates to a lens barrel and an optical apparatus each including an insertable and removable optical filter.

2. Description of the Related Art

Conventionally, an optical apparatus such as a video camera or a digital camera that is configured so that an IR cut filter (an optical filter) is insertable and removable to have a function of a night mode in which a night photography can be performed by obtaining infrared light has been known. Commonly, a lens barrel in the optical apparatus is configured so that the IR cut filter is arranged between a lens disposed at the end portion of a lens unit and an image pickup element, and an insertion and removal mechanism of the IR cut filter is provided at the position. Japanese Patent Laid-Open No. 2010-8801 discloses a configuration in which a guide bar that guides a moving barrel (a focus lens moving barrel) of a focus lens that is an end lens of the lens unit is held by a rear barrel and the insertion and removal mechanism of the IR cut filter is disposed between the rear barrel and an image pickup element holding frame.

However, in Japanese Patent Laid-Open No. 2010-8801, the image pickup element holding frame and the rear barrel by which the guide bar of the focus lens moving barrel is held are configured by separated parts from each other, and therefore it is difficult to perform a positioning of the lens unit for the image pickup element with high accuracy. Accordingly, it is preferred that a configuration in which the guide bar be held by the image pickup element holding frame is adopted. However, since the insertion and removal mechanism of the IR cut filter is disposed between the image pickup element holding frame and the focus lens, the guide bar has to be disposed so as to avoid the IR cut filter. Furthermore, if many movable units exist, the degree of freedom of the arrangement of the guide bar is limited.

SUMMARY OF THE INVENTION

The present invention provides a lens barrel and an optical apparatus each including an insertable and removable optical filter with respect to an optical axis and capable of positioning a lens unit with high accuracy.

A lens barrel as one aspect of the present invention includes a lens holding member that holds a lens, a positioning guide bar of the lens holding member while guiding the lens holding member in an optical axis direction, a rotation blocking guide bar of the lens holding member while guiding the lens holding member in the optical axis direction, an optical filter holding member that holds an optical filter, an optical filter supporting member that is disposed at a side of the lens holding member with reference to the optical filter holding member and that supports the optical filter holding member in the optical axis direction, and an image pickup element holding member that is disposed at a side of an image pickup element with reference to the optical filter holding member and that has a positioning guide bar holding portion that holds the positioning guide bar while holding the image pickup element. The optical filter supporting member includes a rotation blocking guide bar holding portion that holds the rotation blocking guide bar, and the rotation blocking guide bar holding portion is positioned in an insertion and removal range of the optical filter holding member when viewed in the optical axis direction.

An optical apparatus as another aspect of the present invention includes the lens barrel.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1:
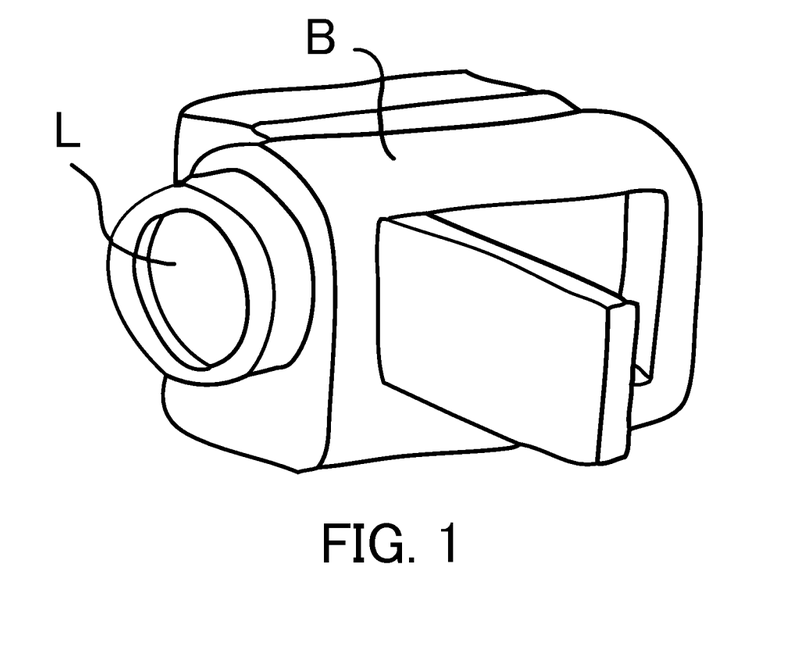
FIG. 1 is a perspective diagram of an optical apparatus (a camera) in the present embodiment.
Figure 2A:
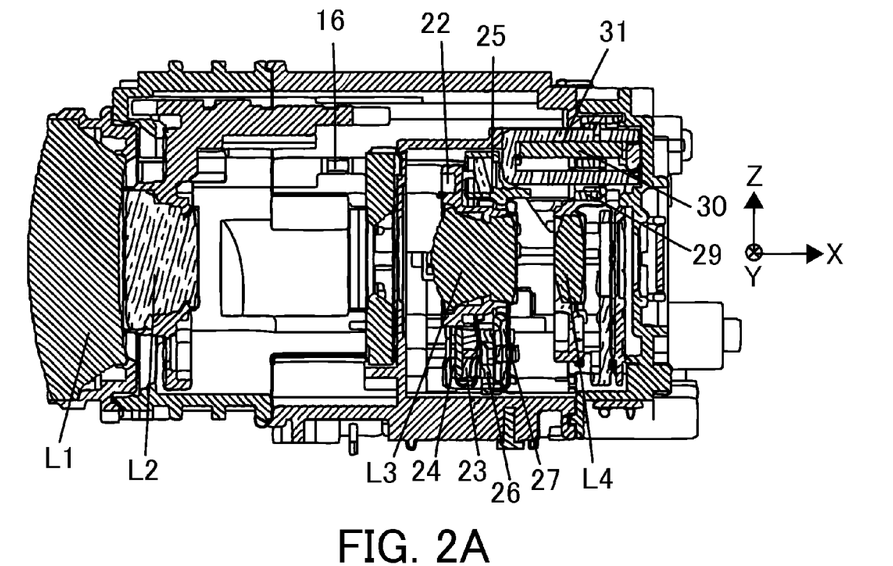
FIG. 2A is a configuration diagram of a lens barrel in the present embodiment (X-Z cross section).
Figure 2B:
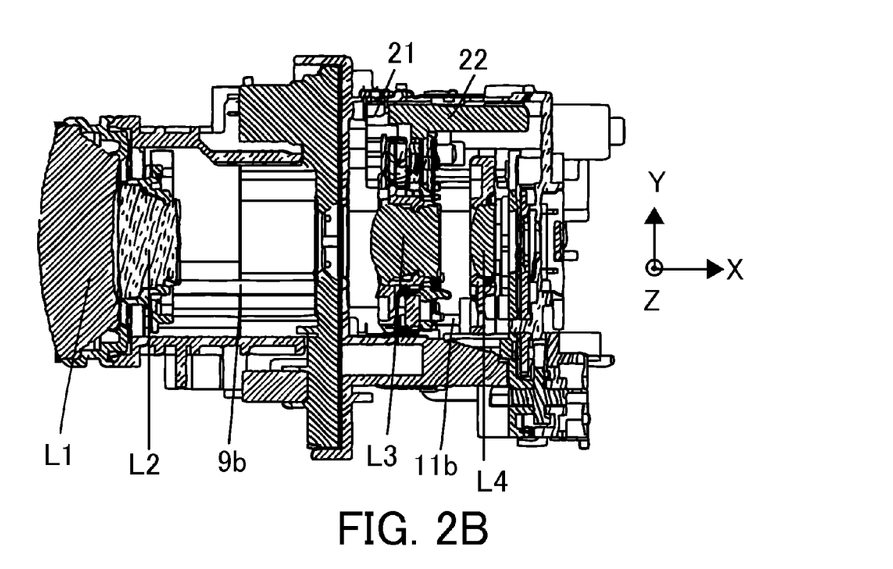
FIG. 2B is a configuration diagram of the lens barrel in the present embodiment (X-Y cross section).
Figure 3:
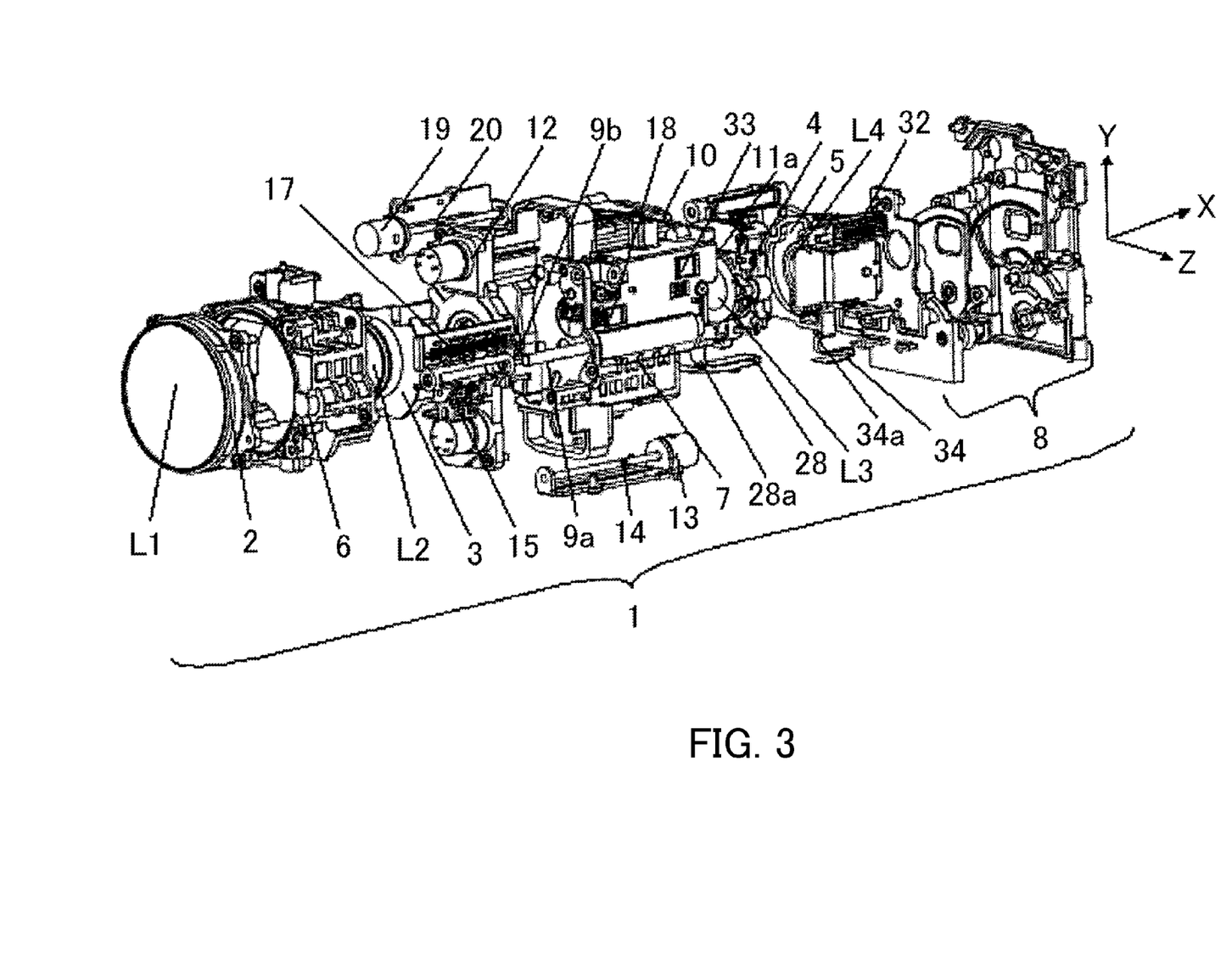
FIG. 3 is an assembly perspective diagram of the lens barrel in the present embodiment.

First of all, referring to FIGS. 1 to 3, configurations of a lens barrel and an optical apparatus (a camera) in the embodiment of the present invention will be described. FIG. 1 is a perspective diagram of an optical apparatus (a video camera) in the present embodiment. FIGS. 2A and 2B are lens configuration diagrams in the present embodiment, and FIGS. 2A and 2B illustrate an X-Z cross-sectional diagram and an X-Y cross-sectional diagram respectively. FIG. 3 is an assembly perspective diagram illustrating the lens barrel in the present embodiment. The lens barrel of the present embodiment is used for an image pickup apparatus such as a video camera, but the present embodiment is not limited to this and the lens barrel may be suitably applied to other optical apparatuses.

As illustrated in FIG. 1, the optical apparatus of the present embodiment is configured by including a camera body B and a lens L. In FIGS. 2A, 2B, and 3, reference numeral L1 denotes a first lens unit, and reference numeral L2 denotes a second lens unit that moves in an optical axis direction of an image pickup optical system to perform a magnification varying operation. Reference numeral L3 denotes a third lens unit that shifts in a direction orthogonal to an optical axis of the image pickup optical system (hereinafter, referred to as an "optical axis orthogonal direction") to reduce an image shake and that is movable in the optical axis direction of the image pickup optical system. Reference numeral L4 denotes a fourth lens unit that moves in the optical axis direction of the image pickup optical system to perform a focusing operation. Thus, the lens barrel 1 is configured by including a four lens units of the first lens unit L1 to the fourth lens unit L4.

Reference numeral 2 denotes a first lens frame that holds the first lens unit L1, and reference numeral 3 denotes a variator moving frame that holds the second lens unit L2. Reference numeral 4 denotes a shift unit that holds the third lens unit L3, and reference numeral 5 denotes a focus moving frame that holds the fourth lens unit L4. Reference numeral 6 denotes a fixed barrel, and reference numeral 7 denotes a rear barrel. The fixed barrel 6 has a rear end that is connected with the rear barrel 7 and a front end that is fixed to the first lens frame 2 in order to fix the first lens unit L1 to a predetermined position. Reference numeral 8 denotes a filter switching unit that includes an IR cut filter switching mechanism (an optical filter switching mechanism) that switches a night mode and a day mode.

Reference numerals 9a and 9b denote guide bars each having both ends held by the fixed barrel 6 and the rear barrel 7. Guide bars 10a and 10b (see FIGS. 4 to 8) and guide bars 11a and 11b each having both ends held by the rear barrel 7 and the filter switching unit 8.

The variator moving frame 3 is supported by the guide bars 9a and 9b so as to be movable in the optical axis direction of the image pickup optical system. The shift unit 4 is supported by the guide bars 10a and 10b so as to be movable in the optical axis direction of the image pickup optical system and is fixed to the rear barrel 7. Reference numeral 12 denotes a light intensity adjusting unit that changes a light intensity that enters the image pickup optical system, which is fixed to the rear barrel 7. The light intensity adjusting unit 12 moves two or more aperture blades in the optical axis orthogonal direction to change an aperture diameter. The light intensity adjusting unit 12 is provided with a gradation ND filter (not shown) configured so as to be insertable into and removable from an optical path independently of the aperture blades. The focus moving frame 5 is supported by the guide bars 11a and 11b so as to be movable in the optical axis direction of the image pickup optical system.

Reference numeral 13 denotes a stepping motor that drives the variator moving frame 3 in the optical axis direction of the image pickup optical system. A lead screw 14 is formed on an output shaft of the stepping motor 13. The stepping motor 13 is fixed to the rear barrel 7. The lead screw 14 is engaged with a rack 15 that is attached to the variator moving frame 3. Therefore, when the stepping motor 13 is energized to rotate the lead screw 14, the variator moving frame 3 is driven in the optical axis direction of the image pickup optical system.

Reference numeral 16 denotes a zoom reset that detects a reference position of the variator moving frame 3. The zoom reset 16 is configured by a photo interrupter that detects switching of a light shielding state and a light transmitting state by the movement in the optical axis direction of a light shielding portion that is formed on the variator moving frame 3. The zoom reset 16 is fixed to the rear barrel 7 via a substrate. The variator moving frame 3 holds a sensor magnet 17 in which a multipole magnetization has been performed in the optical axis direction, and an MR sensor 18 that reads changes of magnetic field lines in accordance with the movement of the sensor magnet 17 is fixed at a position opposed to the sensor magnet 17 in the rear barrel 7. A signal from the MR sensor 18 is used to be able to detect a moving amount of the variator moving frame 3, i.e. a moving amount of the second lens unit L2, from a predetermined reference position.

Reference numeral 19 denotes a stepping motor that drives the shift unit 4 in the optical axis direction. A lead screw 20 is formed on an output shaft of the stepping motor 19. The stepping motor 19 is fixed to the rear barrel 7. The lead screw 20 is engaged with a shift rack (not shown) attached to the shift unit 4. Therefore, when the stepping motor 19 is energized to rotate the lead screw 20, the shift unit 4 is driven in the optical axis direction.

Reference numeral 21 denotes a zoom reset that detects a reference position of the shift unit 4. The zoom reset 21 is configured by a photo interrupter that detects switching of a light shielding state and a light transmitting state by the movement in the optical axis direction of a light shielding portion that is formed on the shift unit 4. The zoom reset 21 is fixed to the rear barrel 7 via a substrate. Furthermore, zoom reset 21 configured by the photo interrupter is set so as to detect the switching of the light shielding state and the light transmitting state of the light shielding portion on conditions that the shift unit 4 is in a moving range and that the focus moving frame 5 is out of a moving range.

Reference numeral 22 denotes a shift holding frame that holds the third lens unit L3. The shift holding frame 22 holds a two-body shift driving magnet 23 and a first yoke 24 that closes a magnetic path of a magnet. Reference numeral 25 denotes a shift base as a base member of the shift unit 4. The shift base 25 holds a shift coil 26 and a second yoke 27 that closes the magnetic path of the shift driving magnet 23 described above. When the shift coil 26 is energized, a driving force is generated in the shift driving magnet 23 and the third lens unit L3 is driven in a direction orthogonal to the optical axis of the image pickup optical system relatively with respect to the shift holding frame 22.

There are two sets of the shift driving magnet 23, the first yoke 24, the second yoke 27, and the shift coil 26, which constitute a shift driving actuator portion. In FIGS. 2A and 2B, a shift driving actuator portion for driving in a pitch direction is provided in a −Z direction with respect to a center of the optical axis of the image pickup optical system, and a shift driving actuator portion for driving in a yaw direction is provided in a Y direction. Thus, since the two sets of the shift driving units are provided, the third lens unit L3 can be driven in any directions in a plane perpendicular to the optical axis of the image pickup optical system.

Furthermore, the shift coil 26 is configured to be soldered with a shift flexible printed circuit board 28 so as to be electrically conducted. The shift flexible printed circuit board 28 is fixed to a stopper (not shown) that is provided on the rear barrel 7, and is also coupled with the shift unit 4 via a U-turn shape portion 28a provided inside the lens barrel. The U-turn shape portion 28a has a shape in which a reaction force of the shift flexible printed circuit board 28 is not applied to the shift unit 4 when the shift unit 4 moves in the optical axis direction.

Reference numerals 29, 30, and 31 denote a drive coil, a drive magnet, and a yoke member that closes magnetic flux respectively that constitute a focus motor (a voice coil motor) that drives the fourth lens unit L4 in the optical axis direction. The drive coil 29 is attached to the focus moving frame 5. The drive magnet 30 is provided inside the yoke member 31, and the yoke member 31 is attached to the filter switching unit 8. When electric current is applied to the drive coil 29, Lorentz force is generated by the mutual repulsion of magnetic field lines that is generated between the drive magnet 30 and the drive coil 29, and the fourth lens unit L4, as well as the focus moving frame 5, is driven in the optical axis direction.

The focus moving frame 5 holds a sensor magnet 32 in which a multipole magnetization has been performed in the optical axis direction, and an MR sensor 33 that reads changes of magnetic field lines in accordance with the movement of the sensor magnet 32 is fixed to the rear barrel 7 at a position opposed to the sensor magnet 32. A signal from the MR sensor 33 is used to be able to detect a moving amount of the focus moving frame 5, i.e. a moving amount of the fourth lens unit L4, from a predetermined reference position. The focus moving frame 5 moves to the object side, i.e. in a −X direction parallel to the optical axis by energizing the coil, and detects a state in contacting a mechanical end as the reference position.

The drive coil 29 is soldered with a focus flexible printed circuit board 34 to be able to be electrically conducted. The focus flexible printed circuit board 34 is fixed to a stopper (not shown) that is provided on the rear barrel 7, and is also coupled with the drive coil 29 that is fixed to the focus moving frame 5 via a U-turn shape 34a that is provided inside the lens barrel.

Figure 4:
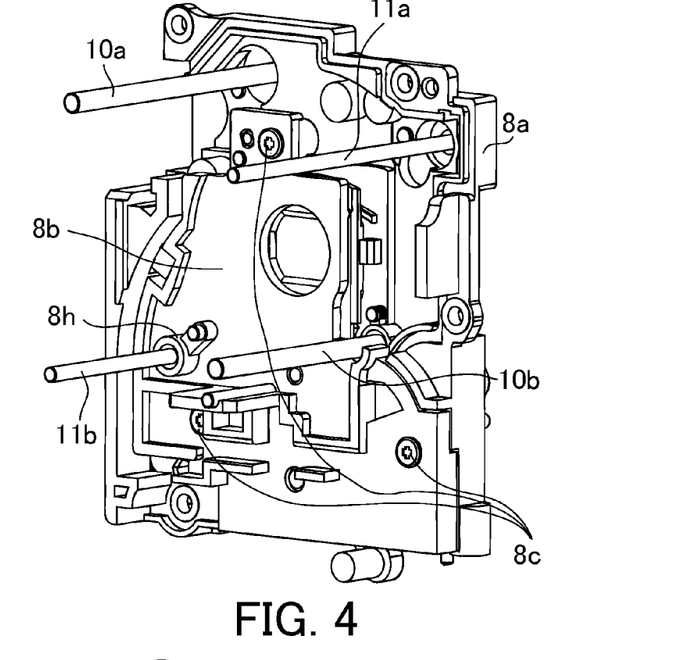
FIG. 4 is an assembly perspective diagram illustrating a filter switching unit and four guide bars in the lens barrel in the present embodiment.
Figure 5:
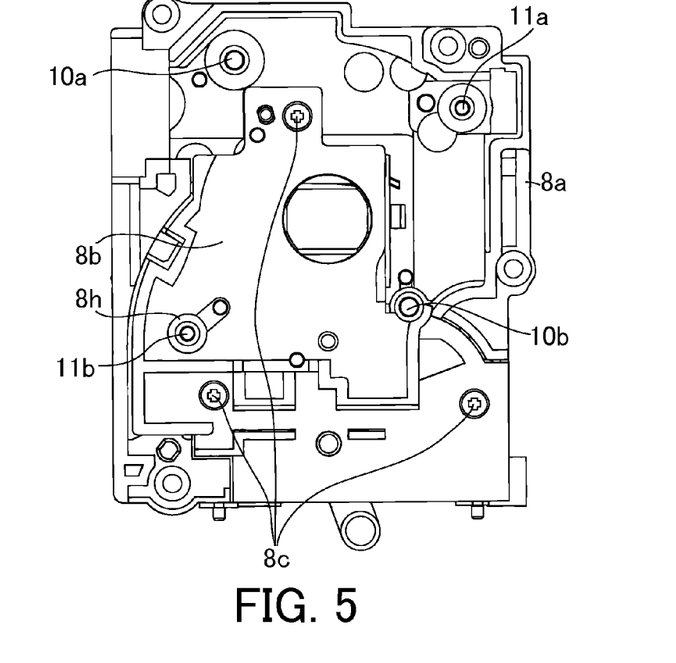
FIG. 5 is a diagram of the same configuration as FIG. 4 when viewed from an object side in the lens barrel of the present embodiment.
Figure 6:
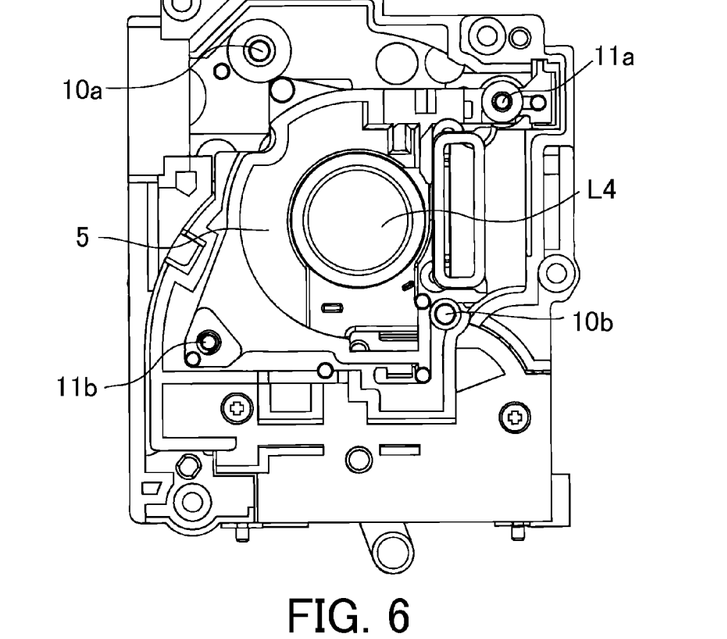
FIG. 6 is an assembly perspective diagram illustrating the filter switching unit, the four guide bars, and a focus moving frame in the lens barrel of the present embodiment.
Figure 7:
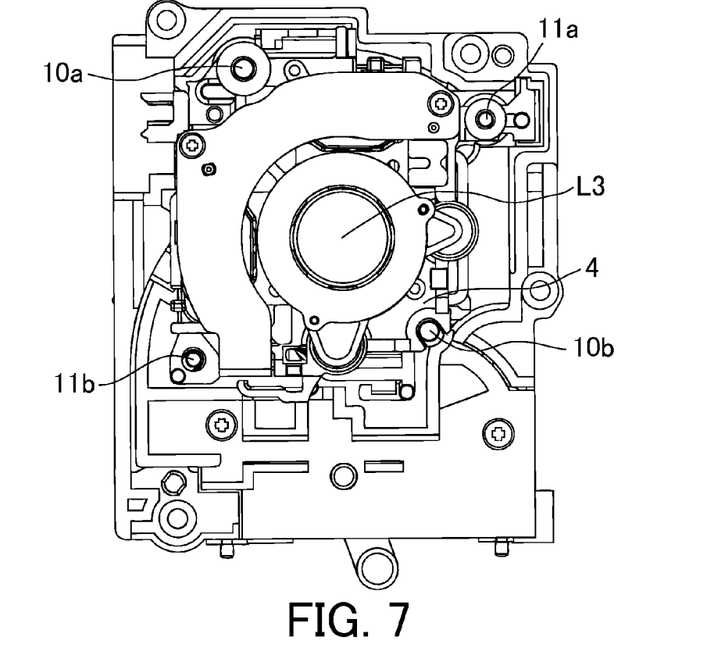
FIG. 7 is an assembly perspective diagram illustrating the filter switching unit, the four guide bars, the focus moving frame, and a shift unit in the lens barrel of the present embodiment.

Next, referring to FIGS. 4 to 7, configurations of the shift unit 4, the two guide bars that guide the shift unit 4, the focus moving frame 5, the two guide bars that guide the focus moving frame 5, and the filter switching unit 8 that are main parts of the lens barrel will be described in detail. FIG. 4 is an assembly perspective diagram illustrating the filter switching unit 8 and the four guide bars, and FIG. 5 is an assembly configuration diagram of the same configuration as the configuration of FIG. 4 when viewed from the object side. FIG. 6 is an assembly configuration diagram illustrating the filter switching unit 8, the four guide bars, and the focus moving frame 5. FIG. 7 is an assembly configuration diagram illustrating the filter switching unit 8, the four guide bars, the focus moving frame 5, and the shift unit 4.

A CCD holder 8a (an image pickup element holding member) is a member that is disposed at a side of an image pickup element (not shown) with reference to an IR holder 8d described below to hold the image pickup element. An optical filter supporting member 8b is disposed at a side of the shift unit 4 and the focus moving frame 5 with reference to the IR holder 8d described below, and has a holding portion 8h that holds at least one of the guide members of guide bars 10a, 10b, 11a, and 11b described below. In the present embodiment, the guide bar 11b is held by the holding portion 8h (a rotation blocking guide bar holding portion), but the present embodiment is not limited to this. The optical filter supporting member 8b is locked on the CCD holder 8a by using three screws 8c. The filter switching unit 8 is configured so that the IR cut filter (an optical filter) can be inserted into and evacuated from the center of the optical axis between the CCD holder 8a and the optical filter supporting member 8b in the optical axis direction of the image pickup optical system.

The guide bars 10a and 10b (a plurality of first guide members) guide the shift unit 4 (a first lens moving frame, or a lens holding member) that holds the third lens unit L3 (a first lens) in the optical axis direction. The guide bar 10a (a positioning guide bar) of the two guide bars 10a and 10b is a guide bar that has a function of positioning the shift unit 4. On the other hand, the guide bar 10b (a rotation blocking guide bar) is a guide bar that has a function of blocking the rotation of the shift unit 4. Both end portions at an imaging plane side (at a CCD side) of the guide bars 10a and 10b are held by the CCD holder 8a.

The guide bars 11a and 11b (a plurality of second guide members) guide the focus moving frame 5 (a second lens moving frame, a lens holding member) that holds the fourth lens unit L4 (a second lens) in the optical axis direction. The guide bar 11a (a positioning guide bar) of the two guide bars 11a and 11b is a guide bar that has a function of positioning the focus moving frame 5. On the other hand, the guide bar 11b (a rotation blocking guide bar) is a guide bar that has a function of blocking the rotation of the focus moving frame 5. An end portion at the imaging plane side (at the CCD side) of the guide bar 11a is held by the CCD holder 8a. On the other hand, an end portion at the imaging plane side of the guide bar 11b is held by the optical filter supporting member 8b.

Thus, the guide bars 10a, 10b, and 11a other than the guide bar 11b of the plurality of guide bars are held by the CCD holder 8a, and a total of four guide bars 10a, 10b, 11a, and 11b are held by the filter switching unit 8. Since the image pickup element is held by the CCD holder 8a, it is preferred that all of the four guide bars be held by the CCD holder 8a in order to improve a relative position accuracy between the image pickup element and each lens unit (the focus moving frame 5 and the shift unit 4). However, when two lens units (the third lens unit L3 and the fourth lens unit L4) are held as described in the present embodiment, four guide bars are necessary. If all of these four guide bars are held by the CCD holder 8a without preventing the motion of an insertion and removal mechanism of the IR cut filter, it is difficult to ensure a sufficient space and therefore the layout of the guide bars is limited.

Figure 8A:
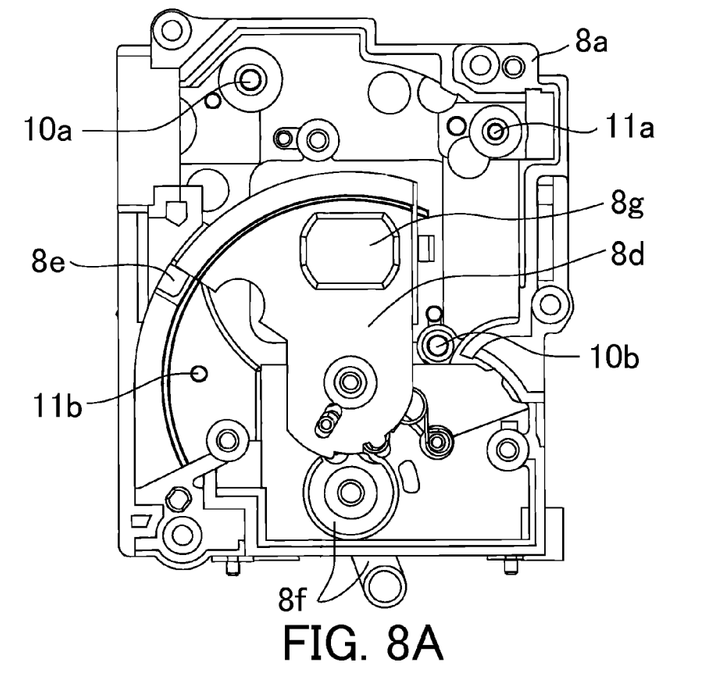
FIG. 8A is a diagram illustrating a position relation of the four guide bars in a state where an optical filter supporting member is excluded from the filter switching unit, i.e. an IR cut filter insertion state, in the lens barrel of the present embodiment.
Figure 8B:
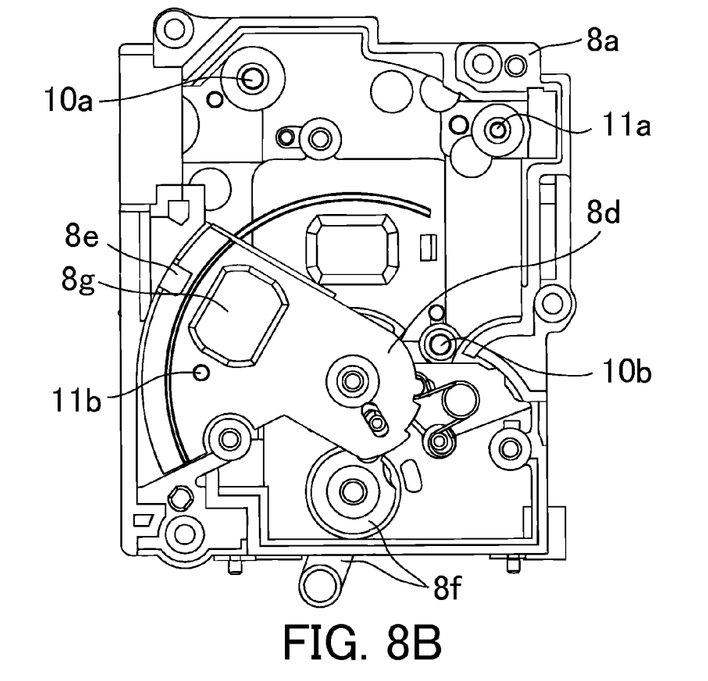
FIG. 8B is a diagram illustrating a position relation of the four guide bars in a state where an optical filter supporting member is excluded from the filter switching unit, i.e. an IR cut filter evacuation (removal) state, in the lens barrel of the present embodiment.

In the present embodiment, the insertion and removal mechanism of the IR cut filter as described below is adopted. Subsequently, referring to FIGS. 8A and 8B, the insertion and removal mechanism of the IR cut filter will be described in detail. FIGS. 8A and 8B are diagrams illustrating a position relation of the four guide bars in a state where the optical filter supporting member 8b is removed from the filter switching unit 8. FIG. 8A illustrates a state in which the IR cut filter is inserted into the optical axis of the image pickup optical system (an IR cut filter insertion state), and FIG. 8B illustrates a state in which the IR cut filter is evacuated (removed) from the optical axis of the image pickup optical system (an IR cut filter evacuation state (removal state)).

In FIGS. 8A and 8B, reference numeral 8d denotes an IR holder (an optical filter holding member) that holds an IR cut filter 8g (an optical filter) to move the IR cut filter 8g so as to be insertable into and removable from the optical axis. Reference numeral 8f denotes a switching lever that switches whether the IR cut filter 8g is inserted into or evacuated from the optical axis (the IR cut filter insertion state and the IR cut filter evacuation state). The operation of the switching lever 8f enables the IR holder 8d to move so as to be in one of the insertion state in which the IR cut filter 8g is inserted into the optical axis or the evacuation state in which the IR cut filter 8g is evacuated from the optical axis. The IR holder 8d is driven by an actuator so as to be inserted into and removed from the optical axis. Reference numeral 8e is a photo interrupter that detects whether the IR cut filter 8g is in the insertion state or the evacuation state.

When the IR holder 8d is in the evacuation state as illustrated in FIG. 8B, positions of the IR holder 8d and the guide bar 11b are overlapped with each other when viewed in the optical axis direction, i.e. a direction orthogonal to a paper surface. In other words, the holding portion 8h of the optical filter supporting member 8b is disposed so as to be overlapped with a moving range (an insertion and removal range) of the IR holder 8d when viewed in the optical axis direction. In the present embodiment, the holding portion 8h of the optical filter supporting member 8b is overlapped with the IR holder 8d when the IR cut filter 8g is in the evacuation state. However, the present embodiment is not limited to this, and the holder portion 8h may also be overlapped with the IR cut filter 8d when the IR cut filter 8g is in the insertion state.

If the end at the imaging plane side of the guide bar 11b is held by the CCD holder 8a, the guide bar 11b has to be disposed at a position evacuated from the moving range between the insertion state and the evacuation stage of the IR holder 8d. In the present embodiment, the holding portion of the guide bar 11b at the image pickup element side (the end at the imaging plane side) is held by the optical filter supporting member 8b to be able to constitute a compact lens barrel without distancing the position of the guide bar 11b from the center of the optical axis.

As described above, the guide bar 11a is a guide bar that has a function of positioning the focus moving frame 5, and the guide bar 11b is a guide bar that has a function of blocking the rotation of the focus moving frame 5. In the present embodiment, the lens barrel is configured so that the guide bar 11b that has the function of blocking the rotation of the guide bars 11a and 11b is held by the IR holder 8d. The guide bar 11a that is used for positioning the lens has a higher accuracy required for positioning the lens, compared with the guide bar 11b that is used for blocking the rotation. The guide bar 11b that is used for blocking the rotation requires an accuracy to some extent in a direction perpendicular to a rotation direction of the focus moving frame 5 while a position displacement in all directions of the guide bar 11a that is used for positioning the lens directly effects on the position accuracy of the lens. Therefore, it is preferred that the guide bar 11b that is used for blocking the rotation, compared with the guide bar 11a that is used for positioning the lens, be held at the side of the IR holder 8d that does not directly hold the image pickup element, i.e. the accuracy is deteriorated compared with the CCD holder 8a.

Figure 9:
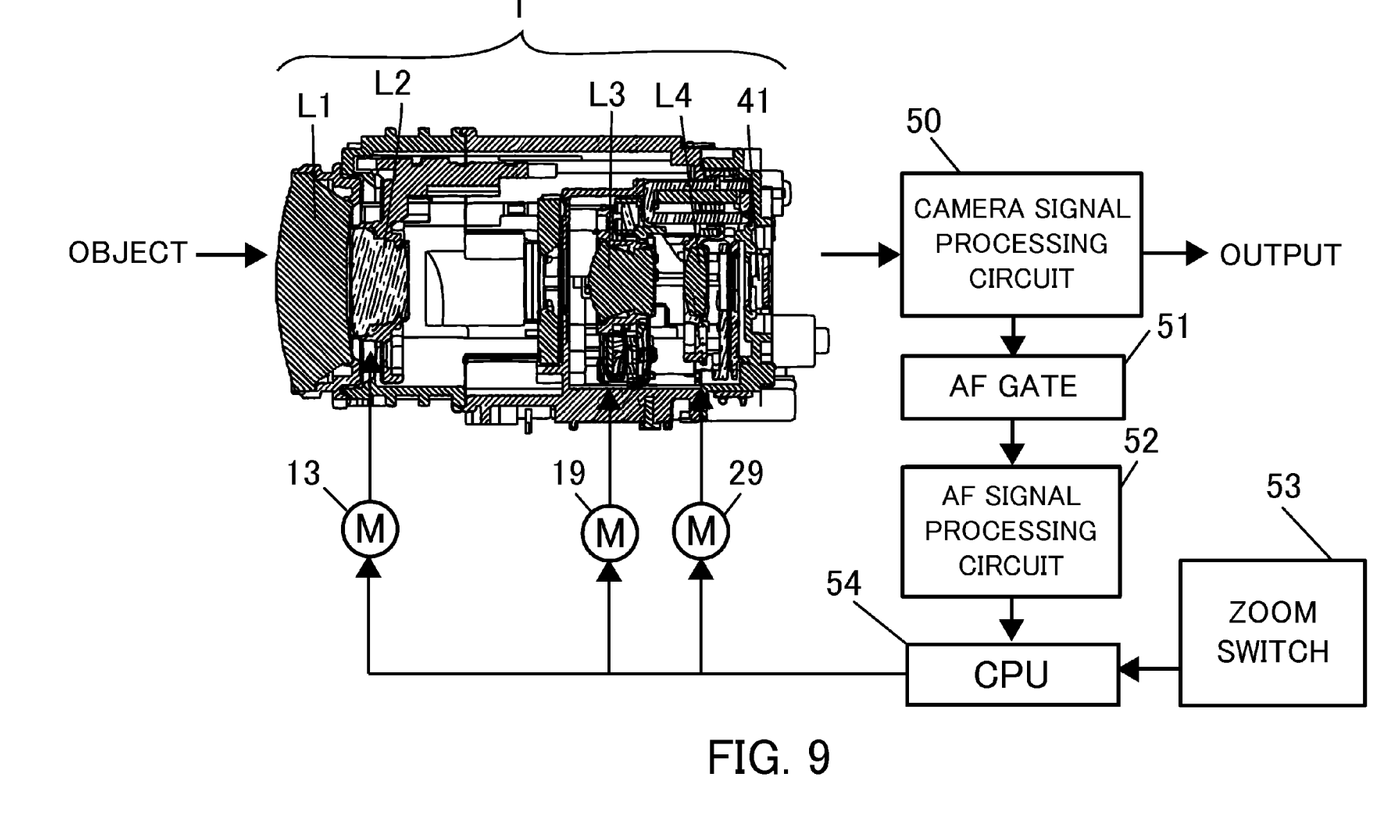
FIG. 9 is a block diagram of an optical apparatus in the present embodiment.

Next, referring to FIG. 9, an operation of an optical apparatus (a camera) that includes the lens barrel in the present embodiment will be described. FIG. 9 is a block diagram of the optical apparatus in the present embodiment. In FIG. 9, light from an object enters an image pickup element 41 via the first lens unit L1 to the fourth lens unit L4 in a lens barrel 1 at the time of taking an image. The light that enters the image pickup element 41 is photoelectrically converted to be inputted to a camera signal processing circuit 50. The camera signal processing circuit 50 performs a predetermined signal processing to output a result of the processing as a digital signal. This digital signal passes an AF gate 51 and a predetermined signal processing for the digital signal is performed by an AF signal processing circuit 52 to be inputted to a CPU 54. The CPU 54 controls the second lens unit L2 to the fourth lens unit L4 so as to be moved by the drive coil 29 and the stepping motors 13 and 19 in the optical axis direction based on the input signal from the AF signal processing circuit 52 in accordance with the operation of a zoom switch 53.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-240900, filed on Oct. 27, 2010, which is hereby incorporated by reference herein in its entirety.

What is claimed is:

1. A lens barrel comprising:
   a lens holding member that holds a lens;
   a positioning guide bar of the lens holding member while guiding the lens holding member in an optical axis direction;
   a rotation blocking guide bar of the lens holding member while guiding the lens holding member in the optical axis direction;
   an optical filter holding member that holds an optical filter;
   an optical filter supporting member that is disposed at a side of the lens holding member with reference to the optical filter holding member and that supports the optical filter holding member in the optical axis direction; and
   an image pickup element holding member that is disposed at a side of an image pickup element with reference to the optical filter holding member and that has a positioning guide bar holding portion that holds the positioning guide bar while holding the image pickup element,
   wherein the optical filter supporting member includes a rotation blocking guide bar holding portion that holds the rotation blocking guide bar, and
   wherein the rotation blocking guide bar holding portion is positioned in an insertion and removal range of the optical filter holding member when viewed in the optical axis direction.

2. The lens barrel according to claim 1,
   the positioning guide bar holding portion is positioned outside the insertion and removal range of the optical filter holding member when viewed in the optical axis direction.

3. An optical apparatus comprising the lens barrel according to claim 1.

* * * * *